US008823576B2

(12) United States Patent
Taniguchi et al.

(10) Patent No.: US 8,823,576 B2
(45) Date of Patent: Sep. 2, 2014

(54) ENCODER COMMUNICATION CIRCUIT (75) Inventors: Mitsuyuki Taniguchi, Gotenba (JP);
Hirofumi Kikuchi, Fujiyoshida (JP)

(73) Assignee: Fanuc Ltd, Yamanashi (JP)

( * ) Notice: Subject to any disclaimer, the term of this patent is extended or adjusted under 35 U.S.C. 154(b) by 1041 days.

(21) Appl. No.: 11/856,930

(22) Filed: Sep. 18, 2007

(65) Prior Publication Data

US 2008/0079624 A1    Apr. 3, 2008

(30) Foreign Application Priority Data

Sep. 29, 2006   (JP) ................................. 2006-267296

(51) Int. Cl.
G08B 19/00  (2006.01)
G08B 21/00  (2006.01)
G08C 19/12  (2006.01)

(52) U.S. Cl.
USPC ................. 341/173; 340/870.01; 340/870.07; 340/870.09

(58) Field of Classification Search
USPC ............ 340/870.01, 870.07, 870.09; 341/173
See application file for complete search history.

(56) References Cited

U.S. PATENT DOCUMENTS

| | | | |
|---|---|---|---|
| 4,325,251 A | 4/1982 | Kanegae et al. | |
| 5,214,582 A | 5/1993 | Gray | |
| 5,721,546 A * | 2/1998 | Tsutsumishita | 341/116 |
| 7,012,397 B2 * | 3/2006 | Taniguchi et al. | 318/601 |
| 7,209,862 B2 * | 4/2007 | Taniguchi et al. | 702/183 |
| 7,526,001 B2 * | 4/2009 | Sanders et al. | 370/532 |
| 2004/0232872 A1 * | 11/2004 | Sunaga et al. | 318/652 |
| 2005/0171713 A1 * | 8/2005 | Taniguchi et al. | 702/69 |
| 2005/0182591 A1 * | 8/2005 | Taniguchi et al. | 702/142 |
| 2006/0018254 A1 * | 1/2006 | Sanders et al. | 370/216 |
| 2006/0238934 A1 * | 10/2006 | Kleine et al. | 361/51 |
| 2008/0079624 A1 * | 4/2008 | Taniguchi et al. | 341/173 |
| 2008/0185233 A1 * | 8/2008 | Tegtmeier et al. | 187/290 |
| 2008/0294285 A1 * | 11/2008 | Shoham | 700/245 |

FOREIGN PATENT DOCUMENTS

| | | |
|---|---|---|
| DE | 10244583 | 4/2004 |
| JP | 62193585 A | 8/1987 |
| JP | 2028900 A | 1/1990 |
| JP | 01-115588 U | 5/1991 |
| JP | 5006698 A | 1/1993 |
| JP | 9311055 A | 12/1997 |
| JP | 2001350675 A | 12/2001 |
| JP | 2005221256 A | 8/2005 |
| JP | 2005-233720 A | 9/2005 |
| WO | 0237399 A1 | 5/2002 |

OTHER PUBLICATIONS

Extended European Search Report of Application No. 07018329.8-2213 mailed Jan. 16, 2008.
Notice of Reasons for Rejection for JP2006-267296 mailed Sep. 16, 2008.

* cited by examiner

Primary Examiner — Hai Phan
Assistant Examiner — Amine Benlagsir
(74) Attorney, Agent, or Firm — Lowe Hauptman & Ham, LLP (57) ABSTRACT

When a communication abnormality occurs between an encoder and communication circuit apparatus in a work apparatus feeding back data output from encoders for control by a control apparatus, an encoder communication circuit is used in place of the encoder to identify the location of occurrence of the abnormality. The encoder communication circuit outputs encoder data comprised position or speed data and alarm data to said control apparatus when connected to the control apparatus through a communication cable.

8 Claims, 10 Drawing Sheets

ENCODER COMMUNICATION CIRCUIT

RELATED APPLICATIONS

The present application is based on, and claims priority from, Japanese Application Number 2006-267296, filed Sep. 29, 2006, the disclosure of which is hereby incorporated by reference herein in its entirety.

TECHNICAL FIELD

The present invention relates to an encoder communication circuit used in place of an encoder for identifying an abnormal location when an abnormality occurs in an apparatus using an encoder.

BACKGROUND ART

In recent years, encoders obtaining position or speed information as electrical signals have become higher in resolution and have become able to handle higher speed rotations. The method of outputting signals from encoders is also changing from the conventional A/B phase output method to the method of transferring data by serial communication not governed by the resolution or rotational speed. Data transferred by serial communication includes not only position information, but also alarm information indicating an abnormality detected in the encoder. An abnormality of the encoder itself can be analyzed by that alarm information (see Japanese Patent Publication (A) No. 2005-233720).

When detecting an abnormality by an abnormality detection circuit, an encoder notifies the control apparatus of the abnormality as alarm information. Due to this, it is possible to identify the abnormal location in the encoder. However, if the communication circuit of the encoder breaks down, the communication cable breaks, the communication circuit of the control apparatus breaks down, etc., the control apparatus detects the communication abnormality and displays an alarm, but the communication is cut, so time is required for identification of the fault location. Further, if the fault location is mistakenly identified, the abnormality will reoccur even after the parts are replaced and further time will be taken for restoration of the apparatus.

In the past, when communication was cut, another encoder was connected to the communication cable and if communication was normally performed was examined to judge if the original encoder was abnormal. However, with this method, since the other encoder was in the initial state, an initial state alarm showing that the absolute position was not established was sent to the control apparatus. When the control apparatus recognized that the encoder was in the initial state, it ended up invalidating the origin information stored for displaying the absolute position of the original encoder. Therefore, at the time of restoration after identifying the abnormal location, an operation for resetting the origin was required.

When connecting another encoder to check the communication, sometimes the original encoder is not the cause of the communication abnormality. For example, sometimes a break in the communication cable is the cause. When the original encoder is not the cause of the communication abnormality, a new communication cable is installed, then the original encoder is attached to the servo motor. However, if reconnecting the original encoder to the control apparatus, since the origin information is invalidated, the origin has to be reset.

This operation for setting the origin requires the reproduction of the predetermined origin position of the table or machine, so depending on the configuration of the machine, complicated, precision work using reference jigs or dial gauges or other measuring devices becomes necessary.

Further, the other replacement encoder for finding the cause of an abnormality would be expensive. Use for finding the cause of an abnormality would be uneconomical. Further, if connecting another encoder, the machine might mistakenly be placed in the operating state, so the work would be accompanied with danger.

DISCLOSURE OF THE INVENTION

The present invention was made in consideration of the above problems and has as its object the provision of an encoder communication circuit able to identify an abnormal location and shorten the time for restoration from the abnormal state when a communication abnormality occurs.

The encoder communication circuit of the present invention comprises a communicator having the same interface as an interface of an encoder connected to a control apparatus and an encoder data generator generating predetermined encoder data including position or speed data and alarm data, wherein the predetermined encoder data is output to the control apparatus through the communication interface when connected to the control apparatus.

The encoder data may be comprised of a single pattern and the single pattern be repeatedly output to the control apparatus or may be comprised of a plurality of patterns and the plurality of patterns be repeatedly output to the control apparatus.

The alarm data may include data showing that the encoder is not in an initial state and further may include at least one type of data of data disabling operation of a servo motor controlled by the control apparatus.

The interface may be made a serial interface.

According to the present invention, at the time of an abnormality in communication of a system or an apparatus using an encoder, it is possible to identify the fault location and possible to shorten the time for restoration of the apparatus. Further, if sending data indicating that the encoder is not in the initial state, the control apparatus will not output an alarm invalidating the storage of the origin position of the machine. Therefore, when it is judged there is trouble other than at the encoder and continuing to use the original encoder, the work of resetting the origin becomes unnecessary. Further, when outputting alarm data for preventing machine operation, it is possible to prevent the machine from mistakenly being placed in the operating state and perform the work for confirming the fault location safely.

BEST MODE FOR CARRYING OUT THE INVENTION

Below, embodiments of the present invention will be explained while referring to the drawings. Before that, however, referring to FIG. 1, a general work apparatus of an example to which the present invention is applied will be explained. The work apparatus uses information from encoders 20, 30 to feedback control a servo motor 16 to make a table 17 move.

Figure 1:
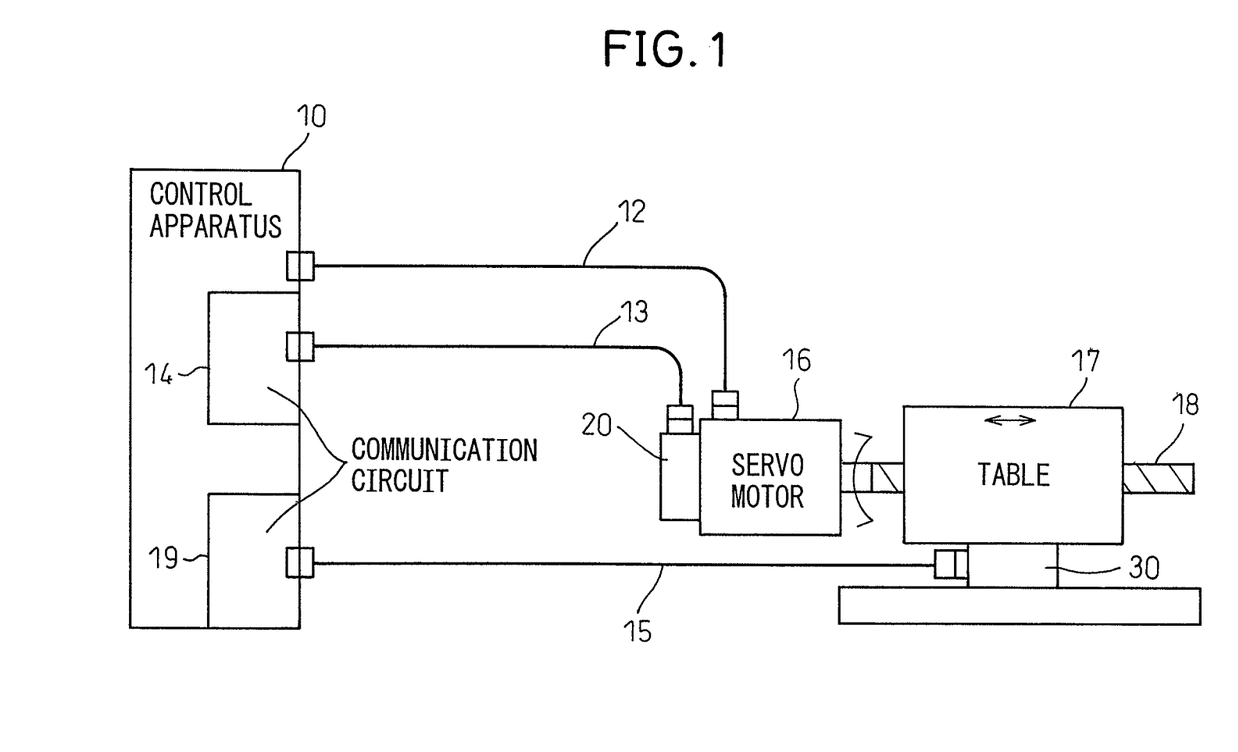
FIG. 1 is a view showing a general work apparatus to which the present invention is applied.

A control apparatus 10 is connected with the servo motor 16 to be controlled through a power line 12. Further, the control apparatus 10 is connected by communication circuits 14, 19 of the control apparatus 10 and first and second signal lines 13, 15 to a first encoder 20 built in the servo motor 16 and a second encoder 30 for detecting the position of the table 17.

The control apparatus 10 uses a communication circuit 14 to communicate with the first encoder 20 through the first communication cable 13. The encoder 20 detects the position or speed of a shaft of the servo motor 16 and sends the detection signal to the control apparatus 10. At the same time, the control apparatus 10 uses the communication circuit 19 to communicate with the second encoder 30 through a second communication cable 15. The second encoder 30 detects the position of the table 17 and sends a detection signal to the control apparatus 10. The control apparatus 10 feed backs the detection signals sent from the encoders 20 and 30 and controls the servo motor 16 through the power line 12.

The shaft of the servo motor 16 is connected with a ball screw 18. The ball screw 18 is engaged with a female thread provided at the table 17 so as to make the table 17 engage in translational motion. The rotation of the servo motor 16 causes the ball screw 18 to rotate and the table 17 engaged with the ball screw 18 to move to the left and right in the figure whereby a workpiece carried on the table 17 (not shown) moves to a predetermined position. While not shown, the table 17 is made to be able to similarly move with respect to the other two axes perpendicular to the ball screw 18.

Figure 2:
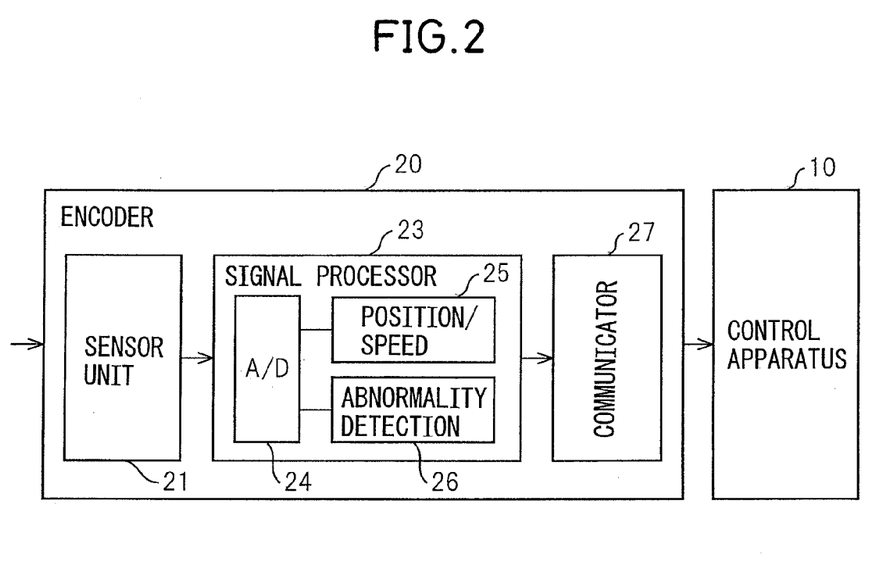
FIG. 2 is a view showing an outline of the encoder used in FIG. 1.

FIG. 2 is a block diagram of an encoder 20 used in the work apparatus of FIG. 1. The encoder 20 is provided with a sensor unit 21 for detecting rotation of a motor shaft and obtaining position or speed information, a signal processor 23 for processing the signal detected by the sensor unit 21, and a communicator 27 for communicating with the control apparatus 10 and transmitting the signal processed by the signal processor 23 to a control apparatus 10.

The signal processor 23 is provided with an A/D converter 24 for converting the analog signal sent from the sensor unit to a digital format to obtain a digital signal, a position/speed data calculator 25 for calculating data showing the position or speed based on the digital signal converted by the A/D converter 24, and an abnormality detector 26 for detecting an abnormal state. The data calculated or detected at the signal processor 23 is sent as a digital signal to the communicator 27 where it is converted to serial data and sent as a communication signal to the control apparatus 10.

Figure 3:
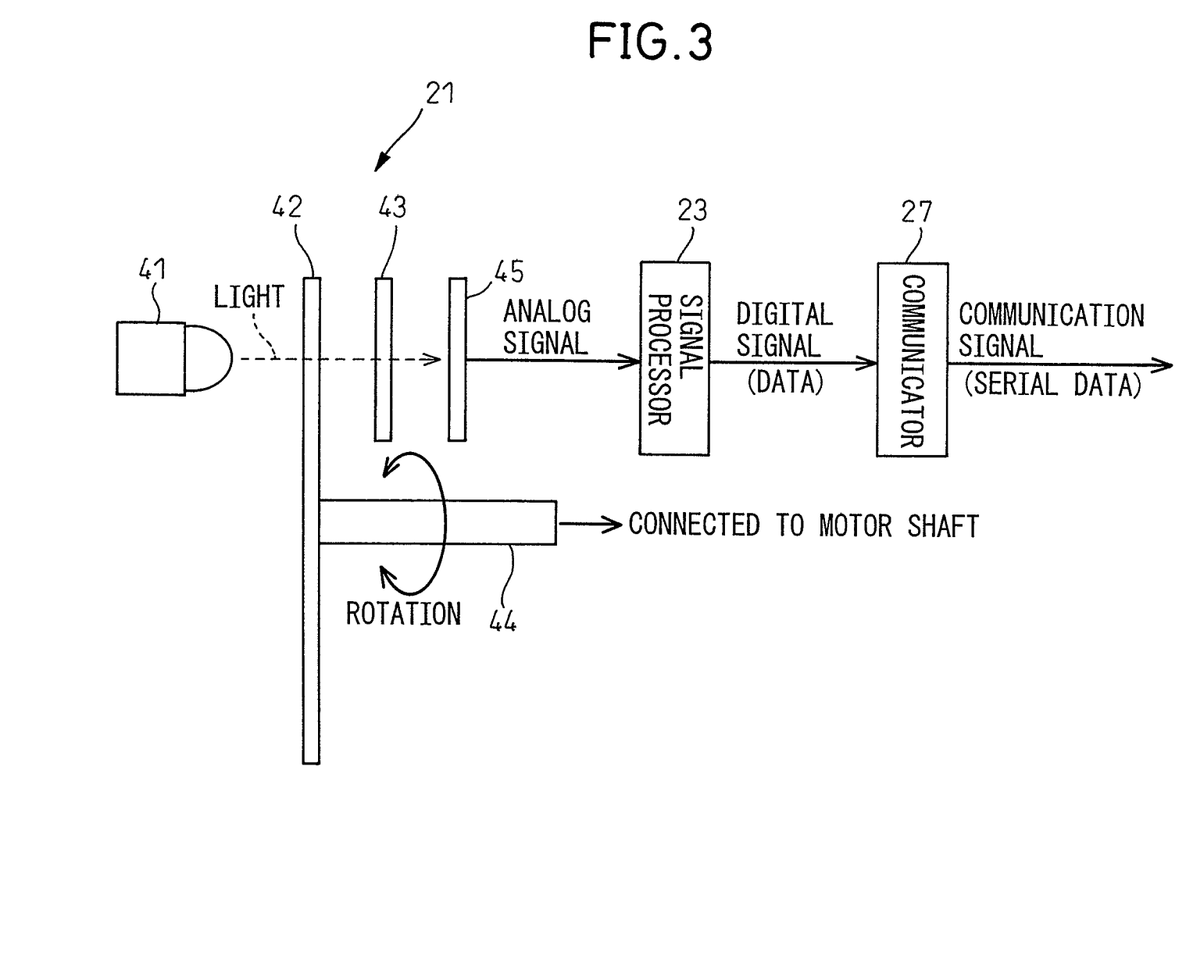
FIG. 3 is a view for explaining a sensor unit of an encoder.

FIG. 3 shows an example of a sensor unit 21 of the encoder of FIG. 2. The sensor unit 21 is provided with one or more light emitting devices 41, a rotating slit disk 42 having slits at its outer periphery, a fixed slit plate 43 arranged facing the light passing slits, and light receiving devices 45 corresponding to the one or more light emitting devices 41. When the light emitted from a light emitting device 41 passes through the rotating slit disk 42 and the fixed slit plate 43, it strikes a light receiving device 45.

A rotary shaft 44 of the rotating slit disk 42 is coupled with the shaft of the servo motor 16. When the rotary shaft 44 rotates along with rotation of the servo motor 16, the rotating slit disk 42 rotates and the position of the slit pattern for coding formed concentrically at the periphery of the rotating slit disk 42 cyclically changes. Along with this, the overlap with the openings of the slit pattern formed concentrically at the fixed slit plate 43 cyclically change and the amount of light striking a light receiving device 45 cyclically changes. From the cyclic changes of the amount of light striking the light receiving device 45, an analog signal having motor rotational speed or position information, for example, A phase and B phase sine wave signals, are obtained. The analog signal having the motor rotational speed or position information is input to the signal processor 23 where it is processed by predetermined signal processing to obtain digital data. This is further sent through the communicator 27 as serial data to the controller 10.

Note that the encoder 30 is a linear encoder for finding the amount of motion or position of a moving body engaged in linear motion. A linear encoder, for example, outputs a position detection signal corresponding to the change in relative positions between a main scale attached to a moving part of the table 17 and an index scale attached to a fixed part of the table 17 so as to find the amount of motion or position. The main scale and the index scale are able to move freely relatively with each other and are straddled at one side by a light emitting device and light receiving device. In this way, the sensor unit of the encoder 30 is identical in principle with the sensor unit of the encoder 20. The signal processor and communicator are also similar, so explanations will be omitted. Below, the explanation will be given for the encoder 20, but the same is true for the encoder 30 as well.

The encoder 20 is provided with an abnormality detector 26. The abnormality detector 26 has a plurality of abnormality detection circuits. For example, a circuit for detecting an abnormality in a sensor unit signal detected by the sensor unit 21 for example calculates amplitude values, offset values, waveform distortion, a phase difference between the phases, etc. for the A phase and B phase sine wave signals and checks if they deviate from predetermined allowable ranges. When the result is that a value is not in the allowable range, the circuit concludes there is an abnormality and sends an alarm to the control apparatus 10. In addition, it can detect many abnormalities such as abnormalities in temperature of the servo motor 16 by the abnormality detector 26 and notify the results to the control apparatus 10.

When abnormality data from the abnormality detector 26 is sent to the control apparatus 10 in this way, the abnormal location is identified, but when the communication circuit of the encoder 20 breaks down, the communication cable 13 or 15 breaks, the communication circuit 14 or 19 of the control apparatus 10 breaks down, etc., communication will be cut off, so the cause of the abnormality will not be able to be identified. Therefore, in the past, as explained above, another encoder was connected to the communication cable to judge if there was an abnormality in the original encoder according to whether communication was performed normally. The present invention provides an encoder communication circuit for identifying an abnormal location at the time of a communication abnormality.

Figure 4:
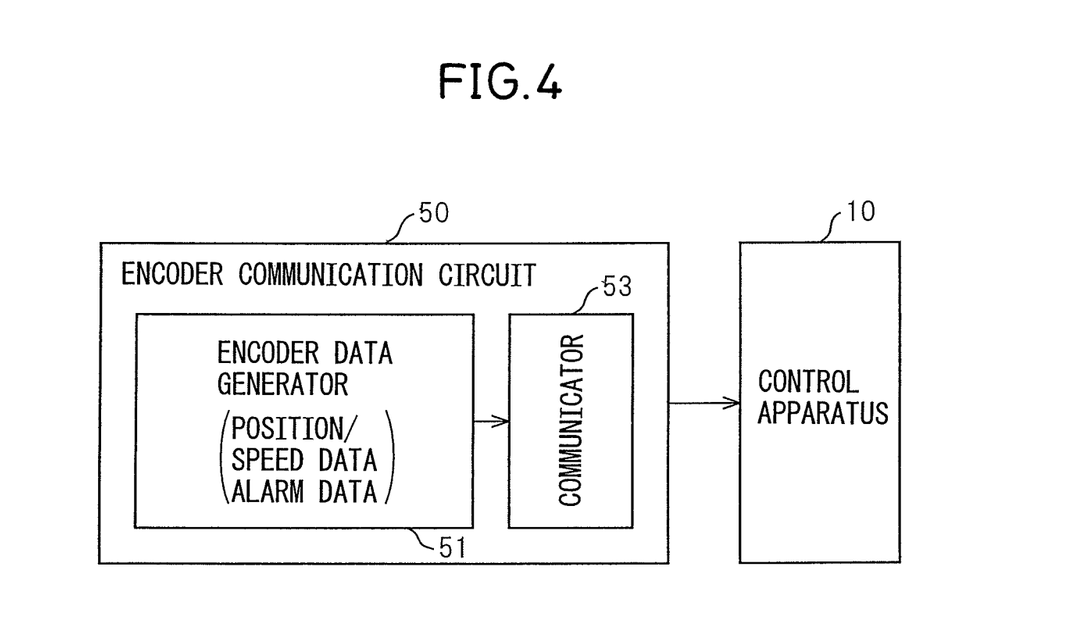
FIG. 4 is a view showing an outline of an encoder communication circuit of the present invention.
Figure 5:
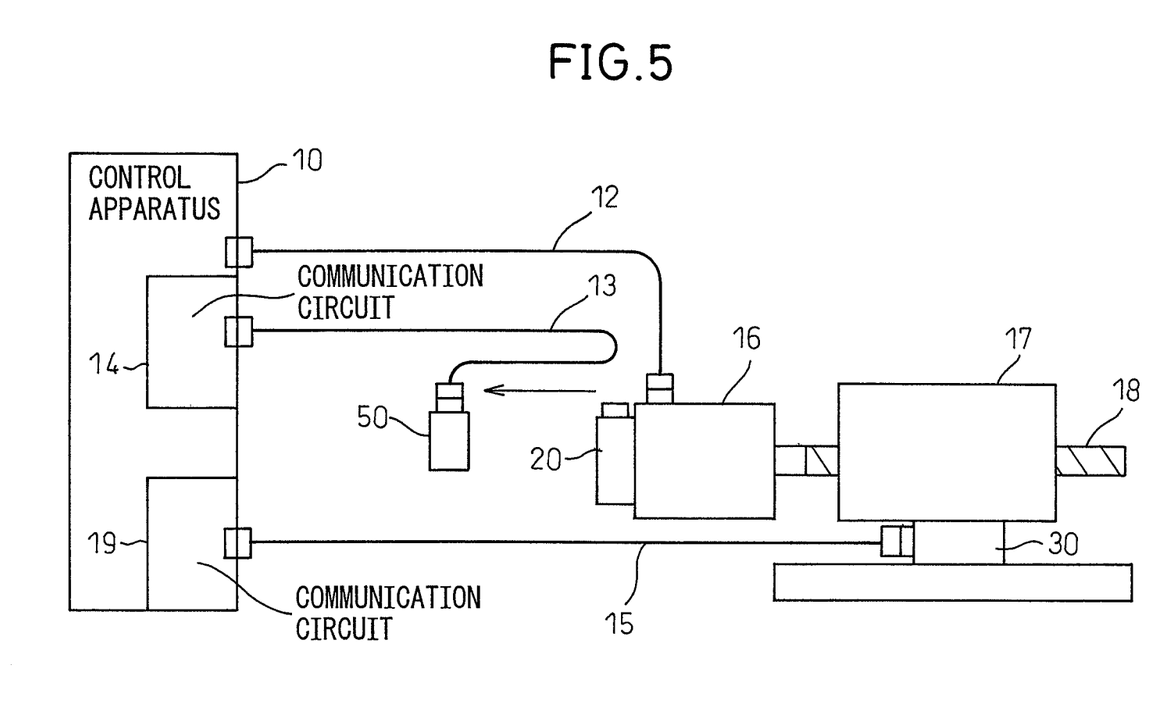
FIG. 5 is a view showing an example of application of an embodiment of the present invention.

FIG. 4 is a conceptual view of an embodiment of an encoder communication circuit of the present invention, while FIG. 5 shows the case of use of an encoder communication circuit instead of the first encoder 20 shown in FIG. 1. An encoder communication circuit can also be used in place of the second encoder 30, but first the explanation will be given covering the encoder 20.

As shown in FIG. 4, an encoder communication circuit 50 is provided with a data pattern generator or encoder data generator 51 and a communicator 53. The encoder data generator 51 generates a data pattern as encoder data including predetermined position or speed information and alarm information. The communicator 53 has the identical interface as the encoder 20. When connected through the communication cable 13 to the controller 10, it can perform prescribed serial communication. The encoder communication circuit 50 does not have any detection circuit for detecting the servo motor position or speed, so is simple in structure and can be inexpensively configured.

If an abnormality in communication occurs and communication is cut off, the control apparatus 10 detects the communication abnormality and displays a communication abnormality alarm. In such a case, the worker, as shown in FIG. 5, replaces the encoder 20 with the encoder communication circuit 50 to search for the cause of the communication abnormality.

If connecting the replaced encoder communication circuit 50 through the communication cable 13 to the controller 10, it is possible to output predetermined encoder information including position or speed information and alarm information through the communicator 53 and search for the cause of the communication abnormality in the same way as when connecting a predetermined other encoder.

Figure 6:
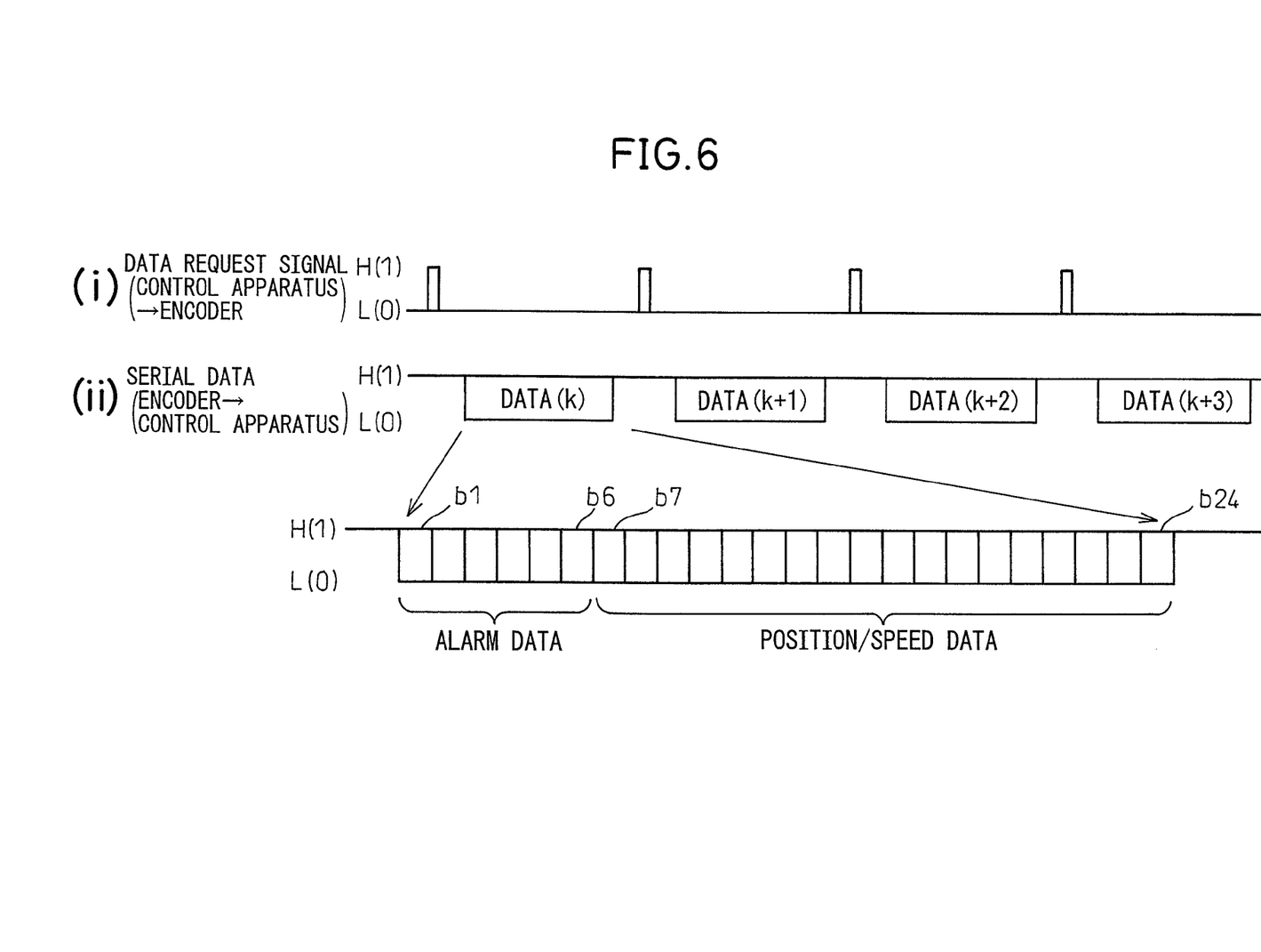
FIG. 6 is a view for explaining general encoder data.

FIG. 6 is a view for explaining an example of a data request signal from the control apparatus and serial data sent by the encoder. In the figure, the H level of the signal is expressed by "1" and the L level of the signal by "0". 1 bit is shown by one section.

When the encoder 20 receives a data request signal (i) from the control apparatus 10, it sends the encoder data, that is, the serial data (ii), to the control apparatus 10. The encoder data is comprised of a serial string of 24 bits. A data request signal using, of that, the 6 bits from the bits b1 to b6 as alarm data showing an abnormality and the 18 bits from the bits b7 to b24 as position/speed data showing the position or speed information is periodically sent. Therefore, the encoder data is also periodically sent.

Figure 7:
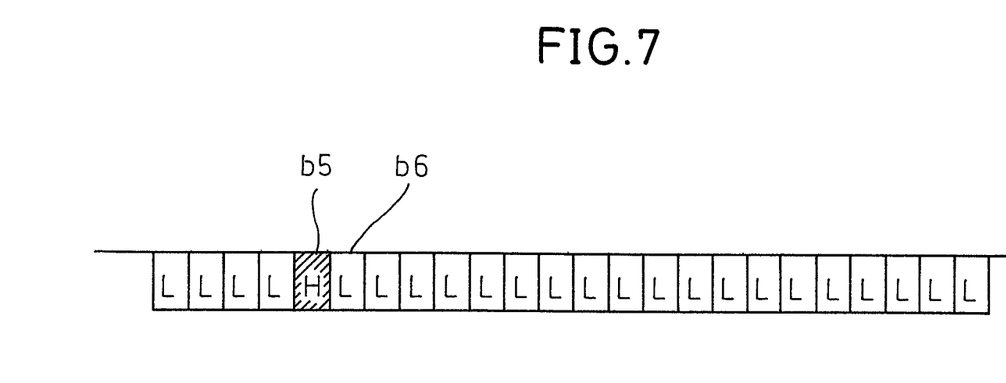
FIG. 7 is a view of an example of encoder data of an encoder communication circuit according to an embodiment of the present invention.

FIG. 7 shows an example of data generated by the encoder communication circuit of the present embodiment. The encoder communication circuit is used only for identifying an abnormal location where a communication abnormality has occurred and is designed to transmit a predetermined data pattern as encoder data.

The example of FIG. 7 sets a fixed single encoder data (k) to be sent from the encoder communication circuit 50 to the control apparatus 10 and repeats this. That is, data (k)=data (k+1)=data (k+2)=data (k+3)= . . . . The data (k) is all "L" except for the bit b5 in the alarm bits, which is H.

Here, the meaning of the "L" of the bit b6 will be explained. The bit b6 is a bit showing if the encoder 20 is in the initial state. The "L" of the bit b6 of the data sent from the encoder communication circuit 50 shows that the encoder is not in the initial state. Therefore, if setting the bit b6 to "L", the encoder communication circuit 50 will never be judged to be in the initially state when connected. Therefore, the control apparatus 10 will never invalidate the position information of the origin position of the original encoder 20. Due to this, even in the case of connecting the encoder communication circuit 50 instead for inspection and as a result finding there is no abnormality in the original encoder 20 and reusing the original encoder 20, there will no longer be any need for the troublesome work of resetting the origin position.

Note that when replacing the original encoder 20 with another encoder like in the past, the bit b6 will be "H", so the control apparatus 10 receiving the encoder data will invalidate the stored value of the position information of the origin position, display that the encoder 20 is in the initial state, and display a prompt for an operation for newly setting the origin position of the machine or table 17. Further, it will send a signal for making the bit showing if the state is the initial state or not "L" (alarm reset signal) instead of a data request signal. In this way, it will demand an operation for resetting the origin position.

Next, the meaning of "H" of the bit 5 of the alarm bits will be explained. When using the encoder communication circuit 50, it would be dangerous if the data sent to the control apparatus 10 caused the control apparatus to mistakenly set the servo motor 16 in the operating state. In this example, the bit b5 is therefore set as "H" for forcibly prevent the servo motor 16 from operating. The bit b5 is a bit showing an abnormality of the encoder. If alarm data with a bit b5 of "H" is received by the control apparatus 10, the control apparatus 10 will display the content of the alarm and perform processing to prevent the servo motor 16 from operating. Therefore, mistaken operation where the servo motor 16 enters the operating state can be avoided.

Note that when there are several other alarm bits for preventing the servo motor 16 from operating, the other alarm bits for preventing the servo motor 16 from operating may also be set to "H" to more reliably prevent the servo motor 16 from operating.

Figure 8:
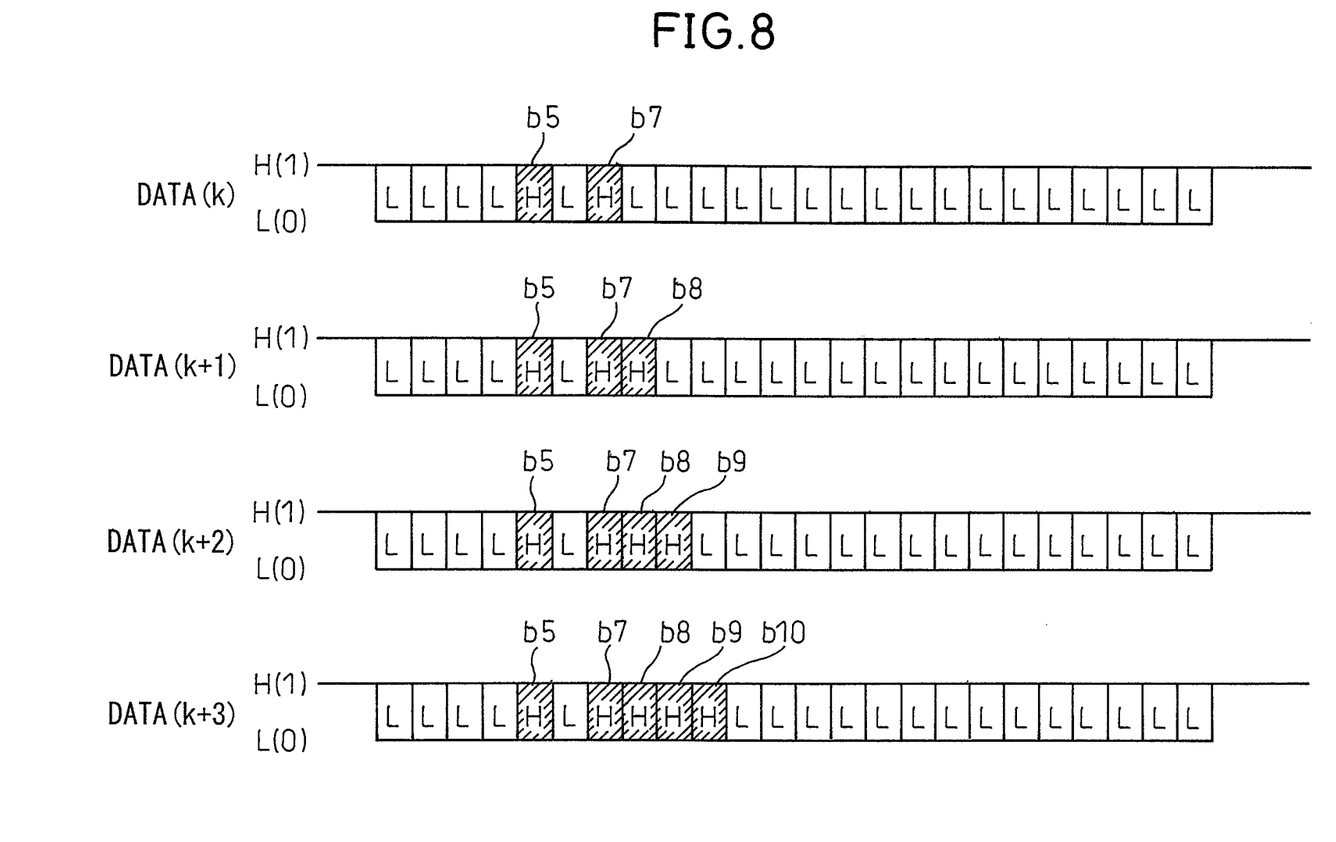
FIG. 8 is a view showing another example of an encoder communication circuit according to an embodiment of the present invention.

FIG. 8 shows another example of the data pattern generated by the encoder communication circuit of the present embodiment. The example of FIG. 8 makes the decoder data sent from the encoder communication circuit 50 to the control apparatus 10 the different data (k), data (k+1), data (k+2), data (k+3). These data (k) to (k+3) are treated as a set and that set of data is repeated. The alarm data b1 to b6 are the same as those of FIG. 7, therefore the effects of the alarm data explained with reference to FIG. 7 are also similar.

In the data of FIG. 8, for the position/speed data, the data (k) has the bit b7 as "H", the data (k+1) has the bits b7 and b8 as "H", the data (k+2) has the bits b7 to b9 as "H", and the data (k+3) has the bits b7 to b10 as "H". These data differ. If sending such different data to the control apparatus 10, the state of the signal on the display screen (not shown) of the control apparatus 10 changes, so it is possible to clearly judge if the signal has been normally received. In the data of FIG. 7, there is no change on the display screen and therefore it is sometimes difficult to judge the state of reception of the signal.

Figure 9:
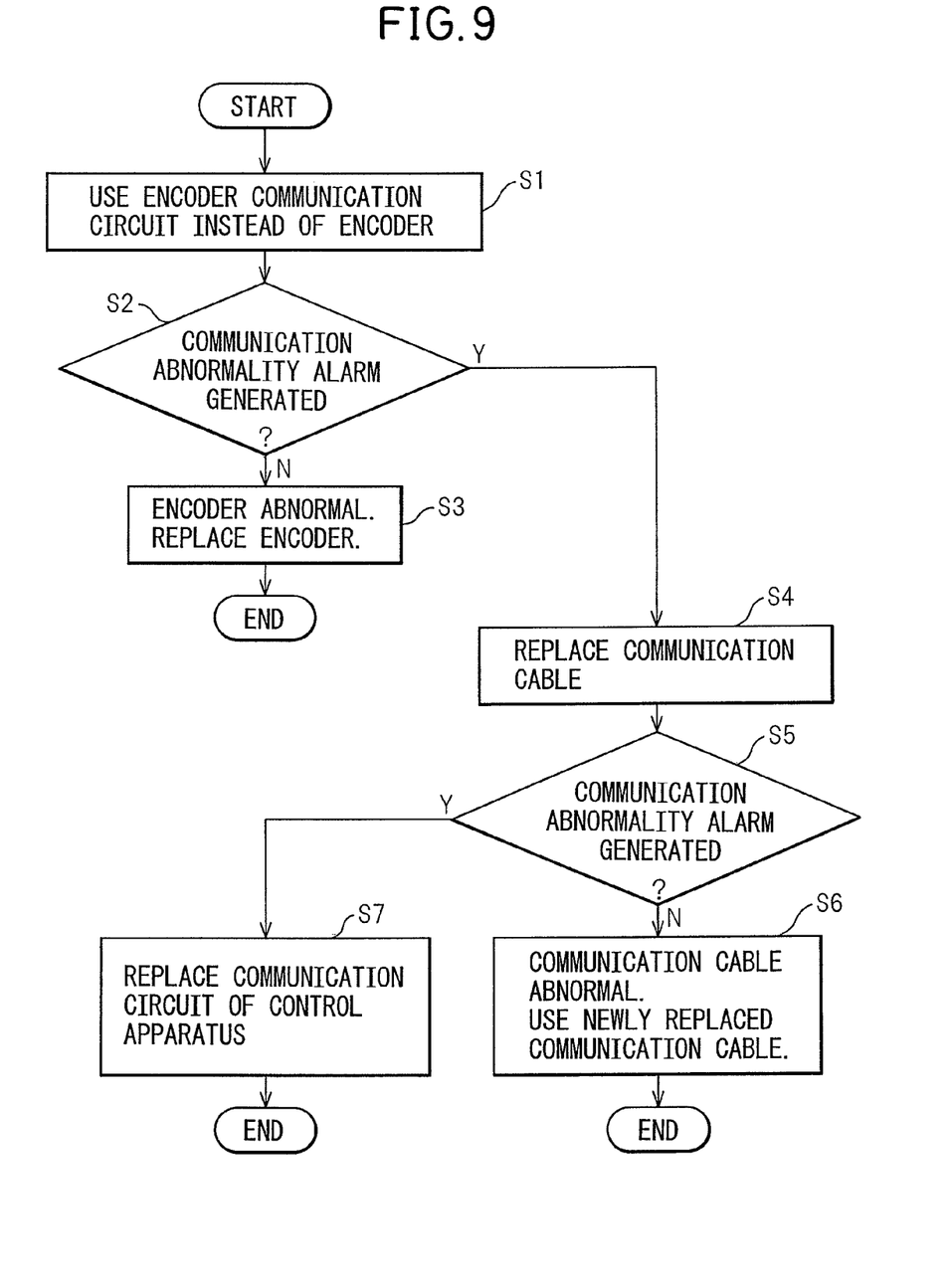
FIG. 9 is a diagram showing the flow of the operation for identifying an abnormal location using an encoder communication circuit according to an embodiment of the present invention.

Referring to FIG. 9, the flow of the operation when there is a communication abnormality in the first encoder 20 and the encoder communication circuit 50 is used to identify the abnormal location will be explained.

When a communication alarm is displayed for the encoder 20, the encoder communication circuit 50 is connected to the control apparatus 10 instead of the encoder 20 (step S1). If the communication abnormality alarm stops being generated by this (step S2), it can be judged that the cause of the abnormality was in the encoder 20, so the encoder 20 is replaced with another encoder and the processing is ended (step S3).

If the communication alarm continues to be generated even if connecting the encoder communication circuit 50 for use, the communication cable 13 is replaced with a normal other communication cable (step S4). If the communication abnormality alarm stops being generated by this (step S5), the communication cable 13 is judged abnormal and the replaced other communication cable is used and the processing ended (step S6). If the communication alarm continues to be generated even if replacing the communication cable 13 with a normal cable (step S5), the communication circuit 14 of the control apparatus 10 can be judged to have broken down, so the communication circuit 14 is replaced and the processing ended (step S7).

When the encoder 20 is judged to be free of any abnormality in this way, the communication cable 13 is replaced or the communication circuit 14 of the control apparatus 10 is replaced. The encoder communication circuit 50 sets the bit b6 of the alarm bits at "L" and does not send an initial state alarm showing that the absolute position is not established in the initial state. Therefore, the control apparatus 10 will not invalidate the stored origin information. Due to this, operation becomes possible without resetting the origin of the table or machine. Further, the encoder communication circuit 50 sets the bit b5 of the alarm bits as "H" and sends an alarm indicating an abnormality of the encoder 20. Therefore, work for safely identifying the abnormal location is possible without mistakenly operating the table.

Figure 10:
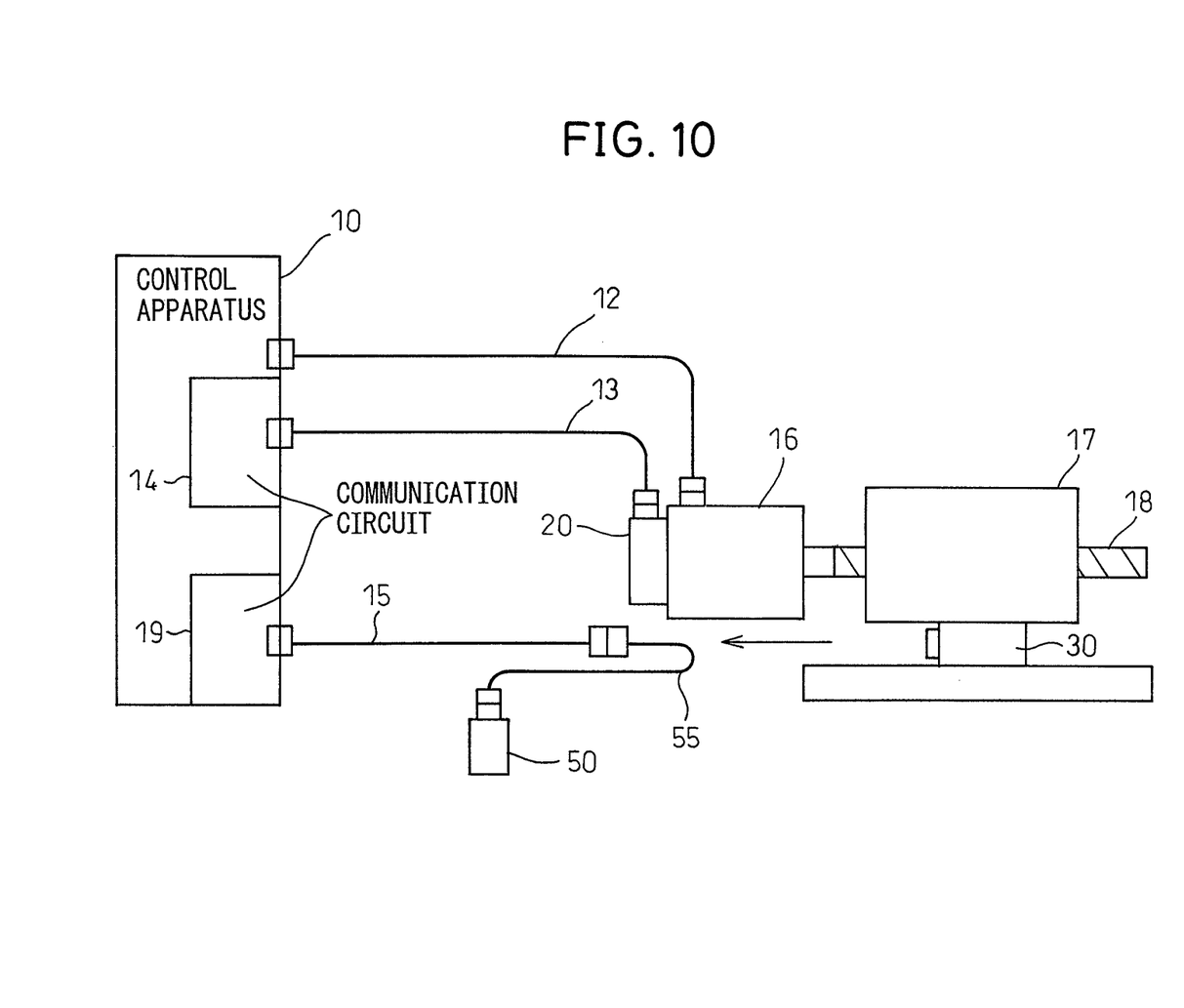
FIG. 10 is a view showing another example of application of an embodiment of the present invention.

As shown in FIG. 10, when a communication abnormality occurs for the second encoder 30, the abnormal location can be judged by using the encoder communication circuit 50 instead of the encoder 30. Use of the encoder communication circuit 50 instead of the second encoder 30 to judge the abnormal location is similar to the case of use of the encoder communication circuit 50 instead of the first encoder 20, so the explanation will be omitted.

When the connector of the second cable connected to the second encoder 30 differs from the connector of the first cable connected to the first encoder 20 and does not fit the encoder communication circuit 50, a connector conversion cable 55 may be used for connection.

Further, the work of identifying the abnormal location explained with reference to FIG. 9 is similar. Due to this, it is possible to judge which of the second encoder 30, communication cable 15, and second communication circuit 19 is abnormal or broken.

Note that in the present embodiment explained above, the alarm data in the data sent by the encoder communication circuit was explained as including data showing that the encoder is not in the initial state and data preventing operation of the servo motor, but this may be omitted in other embodiments depending on the case. For example, as a simple data configuration, it is also possible to configure the encoder data by making all bits "L". In this case, data preventing operation of the servo motor is not included.

The invention claimed is:

1. An encoder communication circuit, comprising:
   a communicator having the same interface as an interface of an encoder, wherein said encoder is connected to an input port of a control apparatus and arranged to detect speed or position information of a machine or table; and
   an encoder data generator generating predetermined encoder data including
   (i) position data and alarm data, or
   (ii) speed data and alarm data,
   wherein
   said predetermined encoder data is output to said control apparatus through said communicator's interface when the encoder is replaced with the encoder communication circuit and the encoder communication circuit is connected to the same input port of said control apparatus in place of said encoder, and
   said alarm data does not include alarm information that requires resetting an origin position of the machine or table.

2. An encoder communication circuit as set forth in claim 1, wherein said encoder data is comprised of a single pattern and the single pattern is repeatedly output to said control apparatus.

3. An encoder communication circuit as set forth in claim 1, wherein said encoder data is comprised of a plurality of patterns and the plurality of patterns are repeatedly output to said control apparatus.

4. An encoder communication circuit as set forth in claim 1, wherein said alarm data includes at least one type of data disabling operation of a servo motor controlled by said control apparatus.

5. An encoder communication circuit as set forth in claim 1, wherein said interface is a serial interface.

6. An encoder communication circuit as set forth in claim 1, wherein said predetermined encoder data output to said control apparatus through said communicator's interface is independent of the speed or position information of the machine or table.

7. An encoder communication circuit as set forth in claim 1, wherein said predetermined encoder data output to said control apparatus through said communicator's interface never indicates that the encoder communication circuit is in an initial state that requires resetting an origin position of the machine or table.

8. An encoder communication circuit as set forth in claim 7, wherein said predetermined encoder data output to said control apparatus through said communicator's interface is independent of the speed or position information of the machine or table.

* * * * *